Patented Jan. 25, 1927.

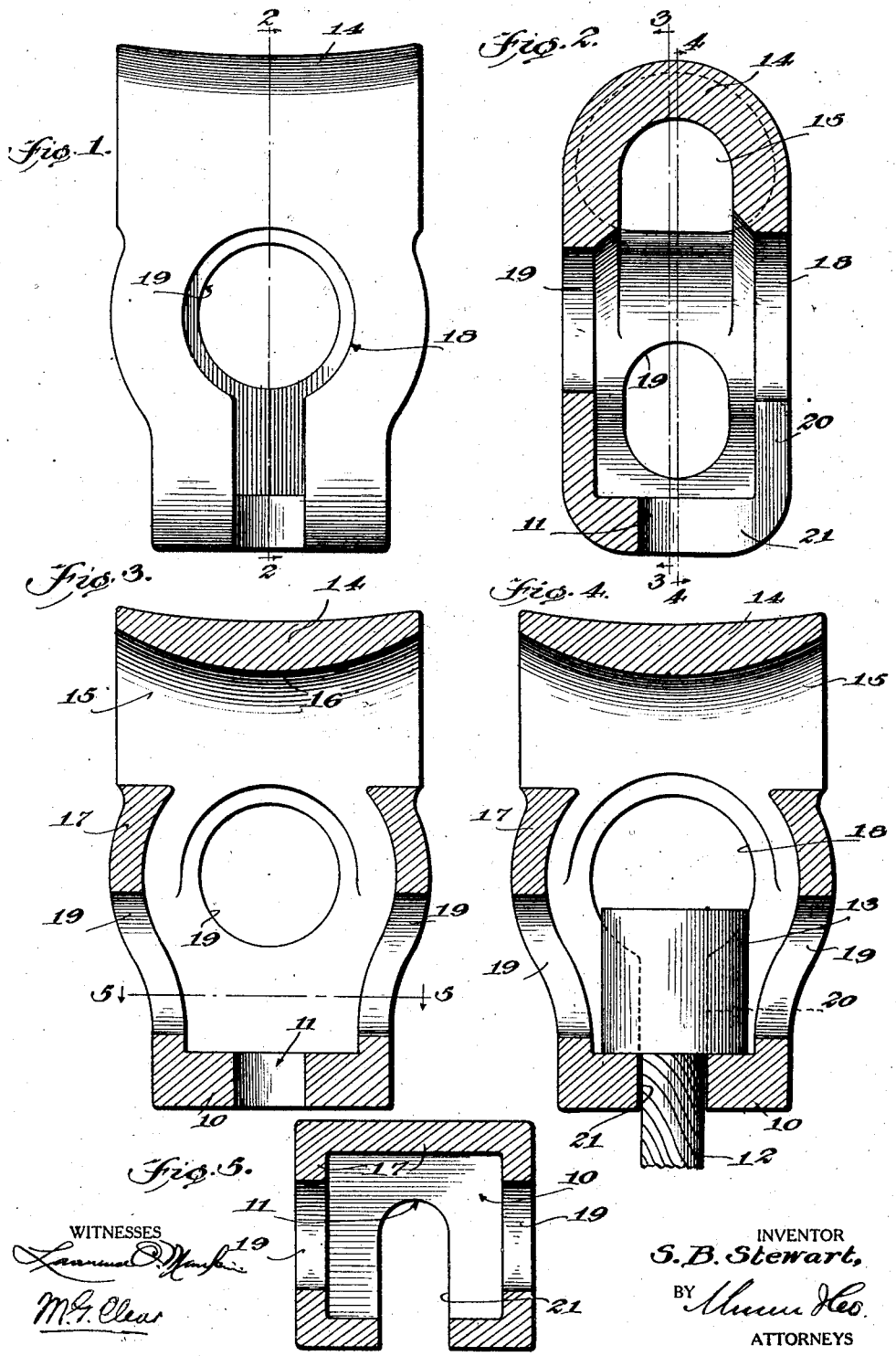

1,615,528

UNITED STATES PATENT OFFICE.

STANLEY B. STEWART, OF CENTRALIA, WASHINGTON.

CHOKER HOOK.

Application filed August 17, 1926. Serial No. 129,839.

My present invention relates to choker hooks such as used in lumbering as an anchor for one end of a choker cable and a guide for the running support of a portion of such cable between its ends, whereby to permit of the formation of a log encircling noose, leaving the other end of the choker cable free for engagement with a bull hook which forms its connection with a haul line or cable.

In choker hooks considerable difficulty has been encountered due to the too ready displacement of the choker cable knob or ferrule, by means of which one end of the cable is maintained in connection with the hook, and from the further fact that it is ordinarly possible to draw the knob or ferrule into the choker hook by a pull upon the haul line. Both of these disadvantages have resulted in battering and deformation, not only of the choker hook but also of the cable ferrule or knob, decreasing very materially the effective life of these parts.

My invention proposes a choker hook in connection with which the above disadvantages will be eliminated by a construction requiring that the cable, ferrule or knob be actually placed and seated within the body of the hook, and by the elimination in this way of all possibility of accidental displacement, since care must be exercised in the removal of the ferrule or knob in the same degree that it is required to insert the ferrule or knob within the hook.

In the accompanying drawing which illustrates my present invention and forms a part of this specification:

Figure 1 is a side elevation of my improved choker hook;

Figure 2 is a central vertical sectional view taken therethrough, substantially on line 2—2 of Fig. 1;

Figures 3 and 4 are vertical sectional views through the choker hooks taken respectively on lines 3—3, and 4—4 of Fig. 2, looking in relatively opposite directions, and, Figure 5 is a horizontal section taken substantally on line 5—5 of Fig. 3.

Referring now to these figures, my invention proposes a choker hook having in one end 10 an axial opening 11, through which the cable 12 passes in use. This end 10 presents a flat seat within the choker hook for the cable ferrule or knob 13, as shown in Fig. 4. At its other end 14 the choker hook has a cable reeve-way 15, the outer wall 16 of which is of the convex curvature shown in order to create minimum friction in its contact with the cable in use.

Between the two ends 10 and 14 are walls 17 completely surrounding that portion of the hook between the cable ferrule or knob seat and the reeve-way 15, these walls being provided with apertures, one of which apertures, as indicated at 18 in Figs. 1, 2 and 4, is of sufficient size to permit of the endwise introduction of the cable ferrule or knob 13, laterally into the body of the hook. The other openings 19 in the other walls 17 which are designed as sight holes as well as to lighten the hook without weakening it are somewhat smaller so as to preclude the passage of the ferrule therethrough. The wall having therein the opening 18, which as shown in Fig. 4, is spaced materially above the seat of the cable ferrule or knob, and the lower end 10 of the hook are provided with alined and communicating slots 20 and 21 which permit of the passage of the cable into the axial opening 11 of the lower end 10 when the cable ferrule or knob is introduced endwise into the hook and straightened up as well as passage thereof in the opposite direction when the cable is detached from the hook.

Obviously, since the cable ferrule or hook, as shown in Fig. 4 must be inserted in and removed from the single opening 18 and introduced endwise into this opening laterally of the hook, it is not possible to first place the cable in the slot and draw the ferrule or knob into the hook by a pull on the haul line as has commonly been the practice with other hooks. It is also obvious that since the foregoing is true accidental displacement of the cable ferrule or knob, after it is placed within the hook, is practically impossible since its removal requires as much care as is required by its insertion within the hook in the first instance.

It is furthermore apparent that as constructed my improved hook will be strong and durable and that the surrounding walls not only contribute to this strength and endurance, but also form a complete and efficient protection for the cable ferrule or knob while the latter is within the hook.

I claim:

A choker hook in the form of a hollow casing having an axial opening at one end for the passage of the cable when in use with a flat seat for a cable knob around said opening within said casing, said hook having a cable reeve-way at its opposite end substantially at right angles to the axis of said opening, and having its outer wall convexed logitudinally to minimize frictional contact with the cable, one wall of the casing between the reeve-way and said opening being provided with an aperture above said seat, said aperture being of sufficient size to permit endwise movement of a cable knob laterally into and out of the hook, the wall having the last mentioned opening as well as the first mentioned end of the hook having cable receiving slots communicating with one another and between the said wall opening and the said axial end opening whereby to require careful insertion and removal of a cable with its knob and protect the latter while within the hook, the other walls having sight openings located above said seat and of a size to prevent the insertion therethrough of the cable knob.

STANLEY B. STEWART.